United States Patent
Tramoni et al.

(10) Patent No.: US 10,505,592 B2
(45) Date of Patent: Dec. 10, 2019

(54) DETECTION OF A NFC DEVICE

(71) Applicant: STMicroelectronics (Rousset) SAS, Rousset (FR)

(72) Inventors: Alexandre Tramoni, Le Beausset (FR); Nicolas Cordier, Aix-en-Provence (FR); Anthony Tornambe, Rousset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/211,964

(22) Filed: Dec. 6, 2018

(65) Prior Publication Data
US 2019/0181919 A1 Jun. 13, 2019

(30) Foreign Application Priority Data
Dec. 7, 2017 (FR) ...................... 17 61798

(51) Int. Cl.
| | | |
|---|---|---|
| H04B 5/00 | (2006.01) | |
| H04B 5/02 | (2006.01) | |
| H04W 52/02 | (2009.01) | |
| G06K 7/10 | (2006.01) | |

(52) U.S. Cl.
CPC ........... *H04B 5/02* (2013.01); *G06K 7/10128* (2013.01); *H04B 5/00* (2013.01); *H04B 5/0056* (2013.01); *H04W 52/0225* (2013.01)

(58) Field of Classification Search
CPC ............................ H04B 5/02; H04W 52/0225
USPC ...................................... 455/41.1, 41.2, 41.3
See application file for complete search history.

(56) References Cited

U.S. PATENT DOCUMENTS

| | | | | |
|---|---|---|---|---|
| 2004/0256460 A1* | 12/2004 | Charrat | ................ | G06K 7/0008 235/451 |
| 2008/0299919 A1* | 12/2008 | Mow | ..................... | H04B 1/0483 455/108 |
| 2009/0203313 A1* | 8/2009 | Martin | ............... | G06K 19/0713 455/41.1 |
| 2012/0264373 A1* | 10/2012 | Thevenon | ............ | G06K 7/0008 455/41.1 |
| 2014/0139322 A1* | 5/2014 | Wang | ................... | H04B 5/0031 340/10.5 |

FOREIGN PATENT DOCUMENTS

| | | |
|---|---|---|
| EP | 3173968 A1 | 11/2015 |
| WO | 03052672 A1 | 6/2003 |

* cited by examiner

*Primary Examiner* — Md K Talukder
(74) *Attorney, Agent, or Firm* — Slater Matsil, LLP

(57) ABSTRACT

A method of detection of the presence, by a first NFC device, of a second NFC device, during periodic field emission bursts, where detection thresholds are adjusted according to results obtained during one or a plurality of previous bursts.

22 Claims, 3 Drawing Sheets

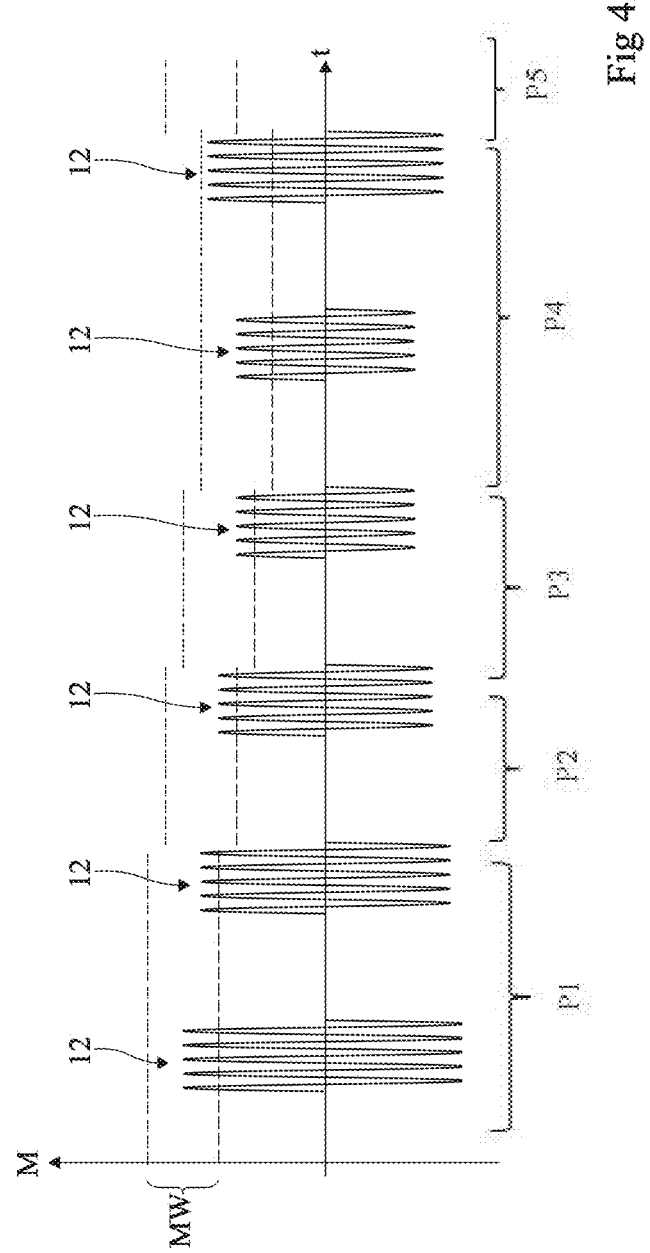

DETECTION OF A NFC DEVICE

CROSS-REFERENCE TO RELATED APPLICATIONS

This application claims priority to French Patent Application No. 1761798, filed on Dec. 7, 2017, which application is hereby incorporated herein by reference.

TECHNICAL FIELD

The present disclosure generally relates to electronic circuits and, in particular embodiments to detection of a near-field communication (NFC) device.

BACKGROUND

Communication systems including electromagnetic transponders are more prevalent, particularly since the development of near-field communication (NFC) technologies.

Such systems use a radio frequency electromagnetic field generated by a device (terminal or reader) to communicate with another device (card).

In recent systems, a same NFC device may operate in card mode or in reader mode (for example, in the case of a near-field communication between two cellular phones). It is then frequent for devices to be powered with a battery and for their functions and circuits to be set to standby to avoid consuming power between periods of use. The devices then have to be "woken up" when they are within each other's range.

SUMMARY

An embodiment reduces all or part of the disadvantages of known techniques of detection of the presence of an electronic device integrating a near-field communication circuit by another electronic device emitting an electromagnetic field, more particularly during stand-by periods.

An embodiment provides a solution avoiding detection errors.

An embodiment provides a solution resistant to variations in environmental conditions.

Thus, an embodiment provides a method of detection of the presence, by a first NFC device, of a second NFC device, during periodic bursts of emission of a field, wherein detection thresholds are adjusted according to results obtained during one or a plurality of previous bursts.

According to an embodiment, the thresholds define an amplitude window of a signal across an oscillating circuit of the first device.

According to an embodiment, the thresholds define a phase window of a signal across an oscillating circuit of the first device.

According to an embodiment, a window used for a current burst is defined by levels measured during at least one previous burst in the absence of a detection.

According to an embodiment, a window used for a current burst is defined by a sliding average of levels measured during a plurality of previous bursts.

According to an embodiment, the first device includes at least two operating modes, among which a first mode where detection bursts are spaced apart by a duration corresponding to at least one hundred times the duration of the bursts.

According to an embodiment, the devices switches to an operating mode of emission of a polling sequence such as defined in the NFC Forum standard when the second device is detected within its range.

An embodiment provides a near-field communication device capable of implementing the described method.

The foregoing and other features and advantages will be discussed in detail in the following non-limiting description of specific embodiments in connection with the accompanying drawings.

BRIEF DESCRIPTION OF THE DRAWINGS

FIG. 4 illustrates the operation of the method described in relation with FIG. 3.

DETAILED DESCRIPTION OF ILLUSTRATIVE EMBODIMENTS

Figure 1:
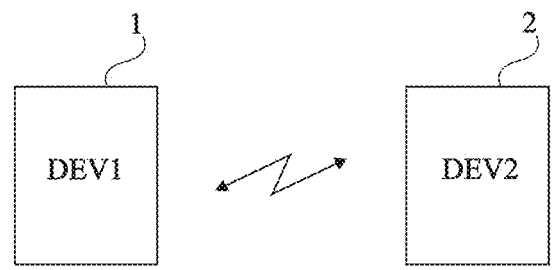
FIG. 1 is a very simplified representation in the form of blocks of an example of a near-field communication system of the type to which the embodiments which will be described apply as an example.

The same elements have been designated with the same reference numerals in the different drawings.

For clarity, only those steps and elements which are useful to the understanding of the embodiments which will be described have been shown and will be detailed. In particular, the generation of the radio frequency signals and the interpretation thereof have not been detailed, the described embodiments being compatible with usual techniques of generation and interpretation of these signals.

Unless otherwise specified, when reference is made to two elements connected together, this means directly connected with no intermediate element other than conductors, and when reference is made to two elements coupled together, this means that the two elements may be directly coupled (connected) or coupled via one or a plurality of other elements.

In the following description, when reference is made to terms "approximately", "about", and "in the order of", this means to within 10%, preferably to within 5%.

The present disclosure relates to electromagnetic transponders or electronic tags (TAG). The present disclosure more particularly applies to electronic devices integrating a near-field communication circuit (NFC) and to the detection of the presence of such a device in the field of another device.

FIG. 1 is a very simplified representation in the form of blocks of an example of a near-field communication system of the type to which the embodiments which will be described apply as an example.

Although the case of two similar electronic devices, for example, two cellular phones, is assumed, all that will be described more generally applies to any system where a transponder detects an electromagnetic field radiated by a reader or terminal. For simplification, reference will be made to NFC devices to designate electronic devices integrating near-field communication circuits.

Two NFC devices 1 (labeled DEV1) and 2 (labeled DEV2) are capable of communicating by near-field electromagnetic coupling. According to applications, for a communication, one of the devices (e.g. device 1) operates in so-called reader mode while the other (e.g. device 2) operates in so-called card mode, or the two devices communicate in peer to peer mode (P2P). Each device includes various electronic circuits for generating a radio frequency signal transmitted by an antenna. The radio frequency field generated by one of the devices is detected by the other device which is located within its range and which also includes an antenna.

When a device (for example, device 1) emits an electromagnetic field to initiate a communication with another NFC device (for example, device 2), the field is captured by device 2 as soon as device 2 is within the range of device 1. The coupling between the two oscillating circuits (that of the antenna of device 2 and that of the antenna of device 1) results in a variation of the load formed by the circuits of device 2 on the field generation oscillating circuit of device 1. In practice, the corresponding phase or amplitude variation of the emitted field is detected by device 1, which then starts a protocol of NFC communication with device 2. On the side of device 1, it is in practice detected whether the amplitude of the voltage across the oscillating circuit and/or the phase shift with respect to the signal generated by circuit 1 come out of the amplitude and phase windows, each defined by a lower threshold and an upper threshold.

Once device 1 has detected the presence of device 2 in its field, it starts a procedure for establishing a communication, implementing emissions of requests by device 1 and of responses by device 2 (polling sequence such as defined in the NFC Forum standard). The circuits of device 2, if they are at stand-by, are then reactivated.

In applications more particularly targeted by the present description, when a NFC device is not communicating, it is switched to the so-called Low Power mode to decrease the consumed power. This is particularly true for devices powered by batteries. In such a low power mode, a device configured in reader mode executes a so-called tag detection or card detection mode and executes detection loops. The detection is similar to that performed when the device is not in low power mode, but the difference is that, in normal mode, the emission of the carrier is continuous and periodically includes polling frames while, to decrease the power consumption, the field emission is performed in periodic bursts with no polling frame when the device is in low power mode. The bursts have a duration much shorter (by a ratio of at least ten, preferably of at least one hundred times shorter) than the field emitted in normal mode for a card polling request.

Figure 2:
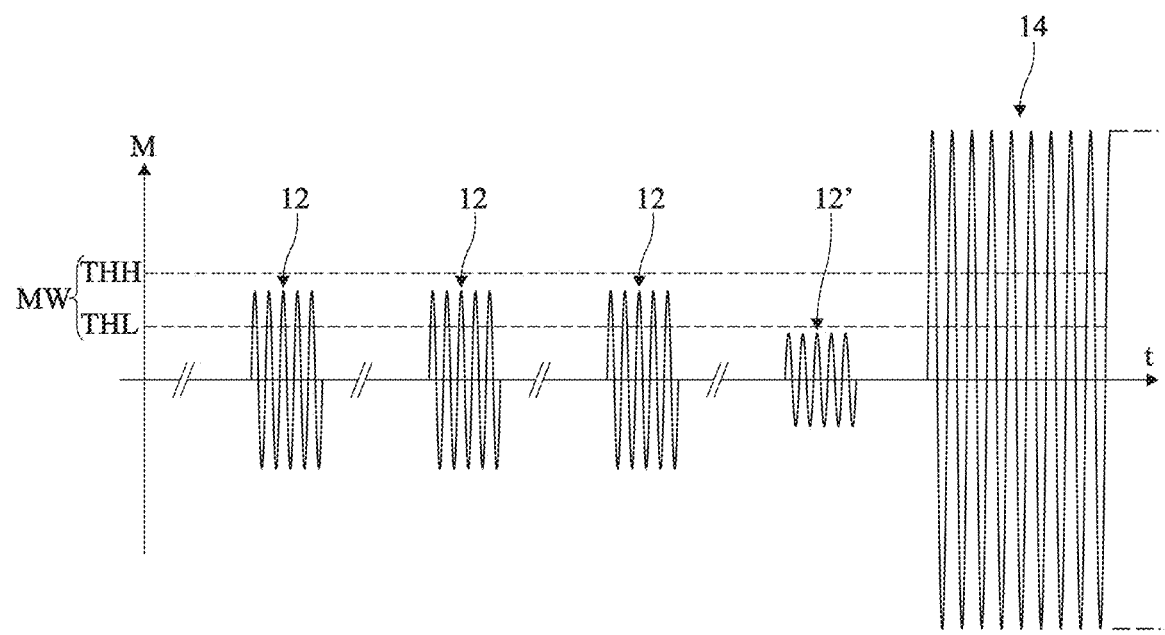
FIG. 2 illustrates in a timing diagram an example of a method of detection, by a device in reader mode at stand-by, of a device in card mode.

FIG. 2 illustrates in a timing diagram an example of a method of detection by a device in reader mode at stand-by of a device in card mode.

FIG. 2 very schematically illustrates an example of the shape of amplitude M of the signal across the oscillating circuit of the device operating in reader mode.

When it is in low power mode, a NFC device which attempts to detect the presence of other devices within its range periodically emits a field burst 12. Such a detection burst generally only includes the carrier, typically at 13.56 MHz, with no modulation and has a relatively short duration as compared with the interval between two bursts, preferably by a ratio of at least 100. The interval between two bursts depends on the devices but is generally of a few hundreds of milliseconds (typically about 256 ms) while the duration of a burst 12 is in the order of some ten or hundred microseconds. When a device is present in the field and modifies the load of the oscillating circuit of the emitter device, this causes an amplitude and/or phase variation of the signal across the oscillating circuit during a corresponding burst 12'. If this variation is sufficient to come out of an amplitude window MW defined by a lower threshold THL and an upper threshold THH (e.g. if an average and/or maximum amplitude of the corresponding burst 12' is lower than the lower threshold THL or higher than the upper threshold THH), the emitter device switches to the active mode, that is, it leaves the low power mode and then emits normally (emission 14).

If desired, device 1 can temporarily and periodically leave the stand-by mode to emit bursts 12. It is however preferred to use a state machine for the emission of bursts in low power mode, which avoids having to wake up a microcontroller of the device and thus enables the device 1 to remain in stand-by mode.

In practice, a card is considered as detected during a detection burst 12 if the amplitude and/or the phase occurs outside of amplitude windows and/or phase windows, each defined by two thresholds respectively representing an amplitude range and a phase range within which it is considered to be in the idle state (with no card in presence). In the example of FIG. 2, it is assumed that the presence of a card causes an amplitude decrease (burst 12'). However, the presence of a card may according to the conditions also cause an amplitude increase. The same applies for the phase shift with respect to the emitted signal.

When a card is detected and the emitter device is activated, it starts emitting the field with communication polling frames 14. The frames are standardized (NFC Forum standard) and are a function of the communication protocols supported by the reader. The receive device (in card mode) responds to the request of the protocol that it supports and the communication starts. The duration of emission of a polling frame is generally in the range from a few milliseconds to a few tens of milliseconds.

When the communication is over or when the receiver device comes out of the field, the emitter device switches back to the low consumption mode after a given time (in the order of one second) to decrease its power consumption. It then starts periodically emitting detection bursts again with no communication request.

A difficulty lies in the fact that the detection by an emitter device of a variation of the amplitude of the field or of the phase thereof may be disturbed by different environmental factors (nearby metal objects, temperature, etc.). This may result either in false detections or, in other cases, a lack of detection.

To attempt overcoming this problem, current solutions include adjusting the thresholds (e.g. by a calibration) before the device switches to the low-consumption mode. Such a calibration of the thresholds includes emitting a carrier burst and measuring the signal across the oscillating to determine an "idle" level. The detection threshold is then adjusted with respect to this idle situation.

However, such solutions turn out to be unsatisfactory. On the one hand, disturbing elements may interfere with the emitted filed and generate false detections or mask devices present in the field. On the other hand, the calibration is performed in hot conditions, that is, at a time when the electronic circuits of the device leave an active mode where they have consumed power and are thus at a relatively high temperature with respect to the room temperature, which is their idle temperature. Such a hot threshold determination adversely affects the reliability of the detection system.

It could be envisaged to wait for the cooling of the circuits to perform the calibration. This however generates a long period (several seconds, or even several minutes) before being able to perform the calibration and, during all this time, the low power mode detection is not operative. This further would not settle the presence of other environmental disturbances.

Figure 3:
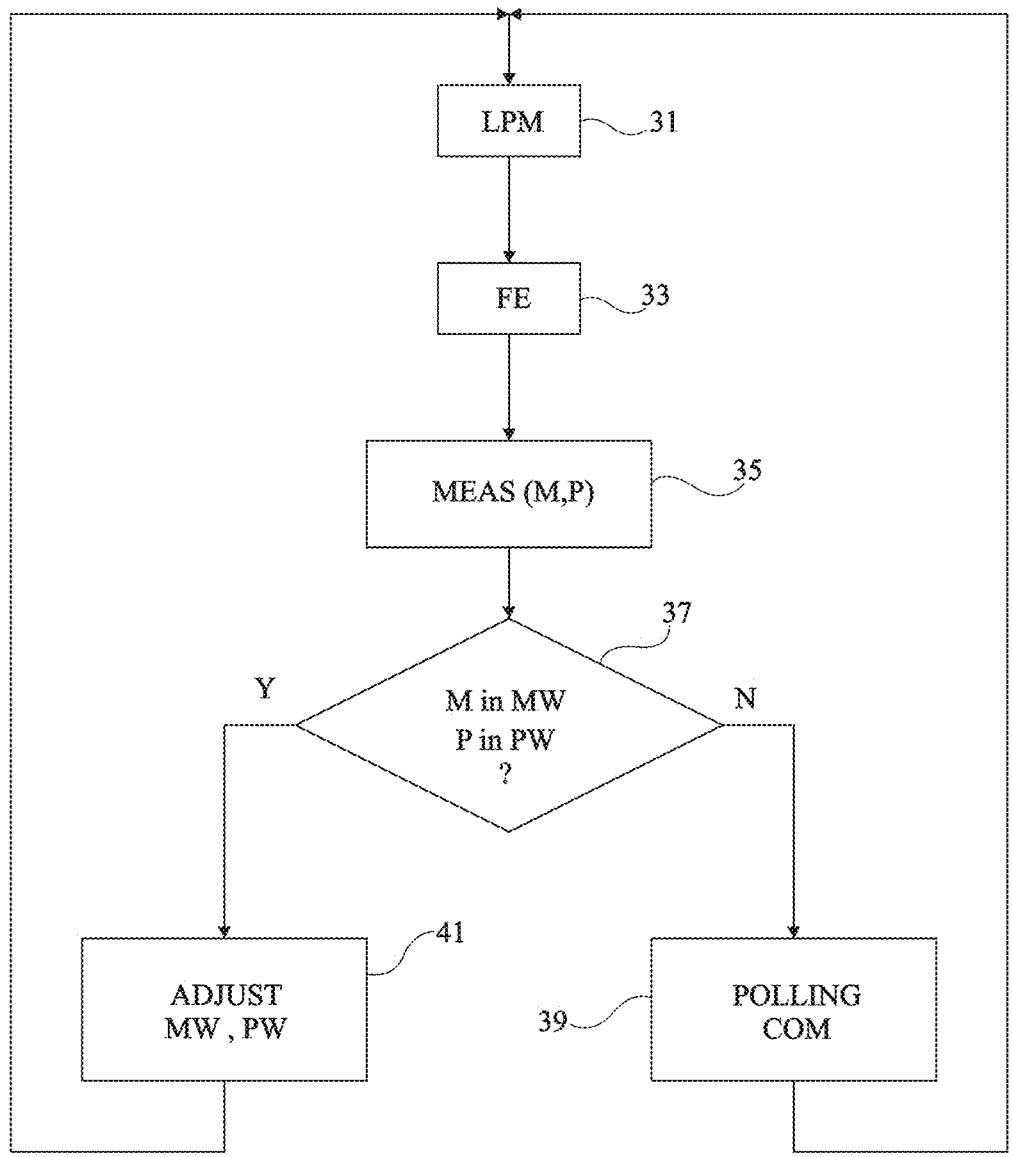
FIG. 3 shows in the form of block diagrams an embodiment of a method of adjusting thresholds for leaving a stand-by mode.

FIG. 3 shows, in the form of blocks, an implementation of a method of adjusting thresholds for leaving a stand-by mode, which amounts to a method of detecting the presence of a NFC device in the field of an emitter device.

According to this embodiment, it is provided to periodically adjust the detection thresholds. Preferably, the adjustment is performed for each detection burst. In other words, the calibration process, currently carried out before switching to the low power mode, is instead executed for each detection burst and while the device is in the low power mode. Indeed, a detection burst corresponds to the emission of a field for a short time period (in the order of some ten or hundred microseconds). It is then possible to measure the amplitude and the phase to adjust the detection thresholds.

The case of a NFC device (for example, DEV1, FIG. 1) which, when it is in low power mode (in block 31, labeled LPM), periodically emits (for example, every 256 ms) a field for a relatively short time period (in the range from some ten to some hundred microseconds) with respect to the duration between two field bursts 12 to detect the presence of another NFC device within its range, is considered. According to the way in which the bursts are implemented (microcontroller or state machine), the device leaves the stand-by mode during the emission of a burst to immediately return thereto afterwards or remains at stand-by as long as no device has been detected. The case where device DEV1 remains at stand-by is assumed in FIG. 3.

For each burst 12, device DEV1 emits a field (in block 33, labeled FE) at the resonance frequency of the system and measures (in block 35, labeled MEAS (M, P)) amplitude M and phase P of the signal across its oscillating circuit (not shown since such oscillating circuitry is known in the art).

Assuming that a second device (DEV2, FIG. 1) is within its range, the simple presence thereof (e.g. due to the coupling between the two antennas) generates an amplitude and phase variation on the side of device 1. If this variation is sufficient for one of the amplitude detection thresholds THM or one of the phase detection thresholds THP to be reached, that is, for the measured amplitude or phase to come out of window MW or PW (output N of block 37, labeled M in MW, P in PW?), the detection is validated. Consequently, as long as one of the phase or amplitude is outside of their respective windows, then the detection is validated or triggered.

Device 1 then leaves the low power mode to initiate a communication (block 39, labeled POLLING COM). The switching may be performed directly after the detection burst or, as illustrated in FIG. 2, after a time interval (short as compared with the time interval between two bursts 12).

In the opposite case (output Y of block 37), that is, if the signal remains in windows MW and PW corresponding to the idle operation, the detection burst stops. Consequently, both phase and amplitude need to be within of their respective windows for the detection burst to stop and for continuous adjustment of each of MW and PW.

However, according to the described embodiment, the amplitude and phase thresholds are updated (block 41, labeled ADJUST MW, PW) according to the values M and P measured during the current detection burst, to be used as thresholds for the next burst. Thus, each detection burst is used not only for the detection but also for the adjustment of the detection thresholds for the next burst(s). The adjusted thresholds are stored and the device continues its monitoring (returns to block 31). In other words, the described embodiment envisages an adaptive adjustment of the amplitude and/or phase thresholds (e.g. periodic adjustment thereof).

In practice, in the case of a state machine, the latter sets to a waiting or inactive mode for a time lag corresponding to the interval between two bursts.

In case of a communication (block 39, labeled POLLING COM), the device is returned to a low power mode (block 31) once the communication is over.

As a variation, the threshold adjustment, rather than being performed for each detection burst, is performed with a burst periodicity, for example, every 2 bursts or every 4 bursts. However, the calibration is preferably performed for each burst since this provides a more reliable (e.g. real-time) detection.

According to an embodiment, the stored thresholds are simply replaced with the new thresholds measured for each burst and the new thresholds are used for the next burst.

According to another embodiment, a sliding average is calculated over a number of measurements in the range from, for example, 5 to 20, preferably in the order of 10. Initially (on switching to the low power mode), the number of thresholds taken into account in the average is smaller (for example, it starts at one and increases incrementally (e.g. by one) along the measurements up to about 10).

FIG. 4 illustrates, in an amplitude timing diagram to be compared with the timing diagram of FIG. 2, the operation of the method described in relation with FIG. 3.

At the beginning (e.g. in time period P1), the (hot) calibration supplies thresholds identical to those of the solution of FIG. 2 (the drawing is out of scale with respect to FIG. 2). However, the thresholds progressively decrease as the electronic circuits of the device cool down. As an example, the thresholds during time period P2 are less than the thresholds during time period P1; the thresholds during time period P3 are less than the thresholds during time period P2; and the thresholds during time period P4 are less than the thresholds during time period P3. Accordingly, a card which would not be detected with the usual solution is here detected and, conversely, a false detection which is only due to the cooling of the device is avoided. Further, the thresholds may increase back (more generally vary, such as during time period P5) in the presence of other disturbing elements in the environment of the device (for example, a hand, a metal object, etc.) as illustrated in the right-hand portion of FIG. 4.

It is noted that the phase measurement and amplitude measurement of a respective time period is compared against the thresholds PW and MW during the respective time period to determine if the phase measurement and amplitude measurement are within their respective thresholds. In response to a determination that the phase measurement and amplitude measurement are within their respective thresholds for the respective time period, the mean of a plurality of phase measurements and the mean of a plurality of amplitude measurements is computed (e.g. by a processor) in order to adjust the thresholds MW and PW. In some embodiments, the mean of the phase measurement of the present time period and the ten most-recent phase measurements is determined; and the mean of the amplitude measurement of the present time period and the ten most-recent amplitude measurements is determined. In such embodiments, the amplitude threshold MW is adjusted to be the mean of the amplitude measurement of the present time period and the ten most-recent amplitude measurements. Similarly, the phase threshold PW is adjusted to be the mean of the phase measurement of the present time period and the ten most-recent phase measurements. In other words, the new thresholds are the mean of some number of current and previously-detected amplitude and phase measurements. It is also noted that the width of the thresholds MW and PW (i.e. the difference between upper and lower levels of each respective threshold) is the same for each time period.

An advantage of the described embodiments is that it is now possible to efficiently use an automatic detection of the leaving of a low power mode by detection of the presence of a device in card mode in the field.

Another advantage is that the described solutions generate a negligible additional power consumption, which is limited to the storage of the threshold for each burst with, possibly, an average calculation. In particular, the actual measurement will generate no additional power consumption since advantage is taken from the measurement performed for the detection.

Another advantage of the described embodiments is that they do not modify the protocols of communication between devices. Thus, the described solutions are compatible with usual systems.

Another advantage is that the implementation of the described embodiments is compatible with a software implementation. Thus, according to an embodiment, the implementation of the described embodiments uses the existing hardware functions of existing devices and only requires a software update to integrate the steps of the detection threshold adjustment method. However, according to a preferred embodiment avoiding to temporarily leave the low power mode for each burst, an implementation by a hardware solution, for example, by a state machine (in wired logic) is provided. This generally allows a faster execution, at lower power.

Various embodiments have been described. Various alterations, modifications, and improvements will readily occur to those skilled in the art. In particular, the selection of the field emission duration for each detection burst and the interval between two bursts may vary from one application to another. Further, the determination of the amplitude of the detection windows (the interval between the two thresholds of definition of the amplitude window and the interval between the two thresholds of definition of the phase window) depends on the application and may vary. Further, the practical implementation of the embodiments which have been described is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method, comprising:
    emitting, by an antenna of a first near field communication (NFC) device, a first emission field having a first duration;
    receiving, at an oscillating circuit of the first NFC device, a current return signal in response to the first emission field;
    determining, by a processor of the first NFC device, a phase of the current return signal and an amplitude of the current return signal;
    comparing, by the processor of the first NFC device, the phase of the current return signal and the amplitude of the current return signal to current phase thresholds and current amplitude thresholds, respectively;
    updating, by the processor, the current phase thresholds and the current amplitude thresholds based on the phase of the current return signal and the amplitude of the current return signal, respectively, and in response to a determination that the phase of the current return signal and the amplitude of the current return signal are within a phase window bounded by the current phase thresholds and an amplitude window bounded by the current amplitude thresholds, respectively; and
    determining, by the processor, that a second NFC device is in proximity to the first NFC device in response to a determination that the phase of the current return signal is outside of the phase window or the amplitude of the current return signal is outside of the amplitude window.

2. The method of claim 1, wherein the current amplitude thresholds used for the current return signal is defined by amplitudes of at least one previous return signal.

3. The method of claim 1, wherein updating the current phase thresholds and the current amplitude thresholds based on the phase of the current return signal and the amplitude of the current return signal, respectively comprises:
    calculating a mean phase using the phase of the current return signal and phases of a plurality of previous return signals; and
    calculating a mean amplitude using the amplitude of the current return signal and amplitudes of a plurality of previous return signals.

4. The method of claim 3, wherein the plurality of previous return signals comprises ten most recent return signals.

5. The method of claim 1, wherein the current amplitude thresholds used for the current return signal is defined by a sliding average of amplitudes measured during a plurality of previous return signals.

6. The method of claim 1, wherein the first NFC device comprises a low-power mode, and wherein a time between a start of the first emission field and a start of an immediately following emission field is at least one hundred times greater than the first duration when the first NFC device is in the low-power mode.

7. The method of claim 6, wherein the time between the start of the first emission field and the start of the immediately following emission field is about 256 milliseconds.

8. The method of claim 6, further comprising switching the first NFC device from the low-power mode to an operating mode in response to a determination that the second NFC device is in proximity to the first NFC device, and emitting, while the first NFC device is in the operating mode, a polling sequence to the second NFC device.

9. The method of claim 8, wherein the polling sequence is defined according to an NFC Forum standard.

10. A near field communication (NFC) device, comprising:
    an antenna configured to emit a first emission field having a first duration;
    an oscillating circuit configured to receive a current return signal in response to the first emission field; and
    a processor configured to:
        determine a phase of the current return signal and an amplitude of the current return signal;
        compare the phase of the current return signal and the amplitude of the current return signal to current phase thresholds and current amplitude thresholds, respectively;
        update the current phase thresholds and the current amplitude thresholds based on the phase of the current return signal and the amplitude of the current return signal, respectively, and in response to a determination that the phase of the current return signal and the amplitude of the current return signal are within a phase window bounded by the current phase thresholds and an amplitude window bounded by the current amplitude thresholds, respectively; and determine that a second NFC device is in proximity to the NFC device in response to a determination that the phase of the current return signal is outside of the phase window or the amplitude of the current return signal is outside of the amplitude window.

11. The NFC device of claim 10, wherein the current amplitude thresholds used for the current return signal is defined by amplitudes of at least one previous return signal.

12. The NFC device of claim 10, wherein updating the current phase thresholds and the current amplitude thresholds based on the phase of the current return signal and the amplitude of the current return signal, respectively comprises:
calculating a mean phase using the phase of the current return signal and phases of a plurality of previous return signals; and
calculating a mean amplitude using the amplitude of the current return signal and amplitudes of a plurality of previous return signals.

13. The NFC device of claim 12, wherein the plurality of previous return signals comprises ten most recent return signals.

14. The NFC device of claim 10, wherein the current amplitude thresholds used for the current return signal is defined by a sliding average of amplitudes measured during a plurality of previous return signals.

15. The NFC device of claim 10, wherein the NFC device comprises a low-power mode, and wherein a time between a start of the first emission field and a start of an immediately following emission field is at least one hundred times greater than the first duration when the NFC device is in the low-power mode.

16. The NFC device of claim 15, wherein the time between the start of the first emission field and the start of the immediately following emission field is about 256 milliseconds.

17. A method, comprising:
operating in a low-power mode by emitting, by an antenna of a first near field communication (NFC) device, a plurality of bursts, each of the plurality of bursts comprising an emission field, each of the emission fields having a first duration;
for each of the plurality of bursts, receiving, at an oscillating circuit of the first NFC device, a current return signal in response to the corresponding one of the emission fields;
determining, by a processor of the first NFC device, a phase of the current return signal;
determining, by the processor of the first NFC device, whether the phase of the current return signal is within a phase window bounded by current phase thresholds by comparing the phase of the current return signal to the current phase thresholds;
updating, by the processor, the current phase thresholds based on the phase of the current return signal in response to a determination that the phase of the current return signal is within the phase window;
determining, by the processor, that a second NFC device is in proximity to the first NFC device in response to a determination that the phase of the current return signal is outside of the phase window; and
in response to determining that the second NFC device is in proximity to the first NFC device, switching from a low-power mode to a communication mode.

18. The method of claim 17, wherein determining whether the phase of the current return signal is within the current phase thresholds comprises calculating a mean phase using the phase of the current return signal and phases of a plurality of previous return signals and comparing the mean phase of the current return signal to current phase thresholds, and wherein the updating comprises updating the current phase thresholds based on the mean phase of the current return signal.

19. The method of claim 18, wherein the plurality of previous return signals comprises ten most recent return signals.

20. The method of claim 18, wherein the current phase thresholds used for the current return signal is defined by a sliding average of phases measured during a plurality of previous return signals.

21. The method of claim 17, wherein a time between a start of the first emission field and a start of an immediately following emission field in the next burst is at least one hundred times greater than the first duration when the NFC device is in the low-power mode.

22. A system configured to implement the method of claim 16, the system comprising the first NFC device, wherein the first NFC device comprises:
the antenna configured to emit the plurality of bursts;
the oscillating circuit configured to receive the current return signal in response to the corresponding emission field;
a memory comprising program instructions, the program instructions configured to
determine the phase of the current return signal;
determine whether the phase of the current return signal is within a phase window bounded by current phase thresholds by comparing the phase of the current return signal to the current phase thresholds;
update the current phase thresholds based on the phase of the current return signal in response to the determination that the phase of the current return signal is within the phase window;
determine that the second NFC device is in proximity to the first NFC device in response to the determination that the phase of the current return signal is outside of the phase window; and
wherein the first NFC device is configured to switch from a low-power mode to a communication mode in response to determining that the second NFC device is in proximity to the first NFC device.

* * * * *